Sept. 8, 1953     C. STRAUB     2,651,498

TRAILER HOIST

Filed July 31, 1950

Inventor
Carl Straub
A. Hiram Sturges
By
Attorney

Patented Sept. 8, 1953

2,651,498

UNITED STATES PATENT OFFICE 2,651,498

TRAILER HOIST

Carl Straub, Nebraska City, Nebr.

Application July 31, 1950, Serial No. 176,857

3 Claims. (Cl. 254—127)

The principal object of this invention is to provide a hoist or crane which is mounted on wheels and can be towed like a trailer behind an automobile.

Another object is to provide a trailer having its upwardly extending members collapsible to a horizontal position whereby the crane can pass under low bridges and the like.

A further object is to provide a trailer hoist, the wheel base of which is laterally extendable for providing stability when used as a hoist, without the wheel base being excessively wide for highway travel as a trailer.

A further object is to provide a trailer hoist having a main boom which is extendable rearwardly for increased length during hoisting and is collapsible to a lesser length for highway travel during trailing.

Yet another object is to provide power operated means, such as a hydraulic ram or its equivalent to be used for spreading the side frame members of the hoist in order to spread the wheels for greater stability.

Still another feature resides in the provision of two legs which are adapted to be extended outwardly and rearwardly of the hoist for increasing stability during hoisting.

Other objects reside in the provision of means for supporting the mast and boom during road travel and for carrying telephone poles and the like.

Yet another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

Figure 1:
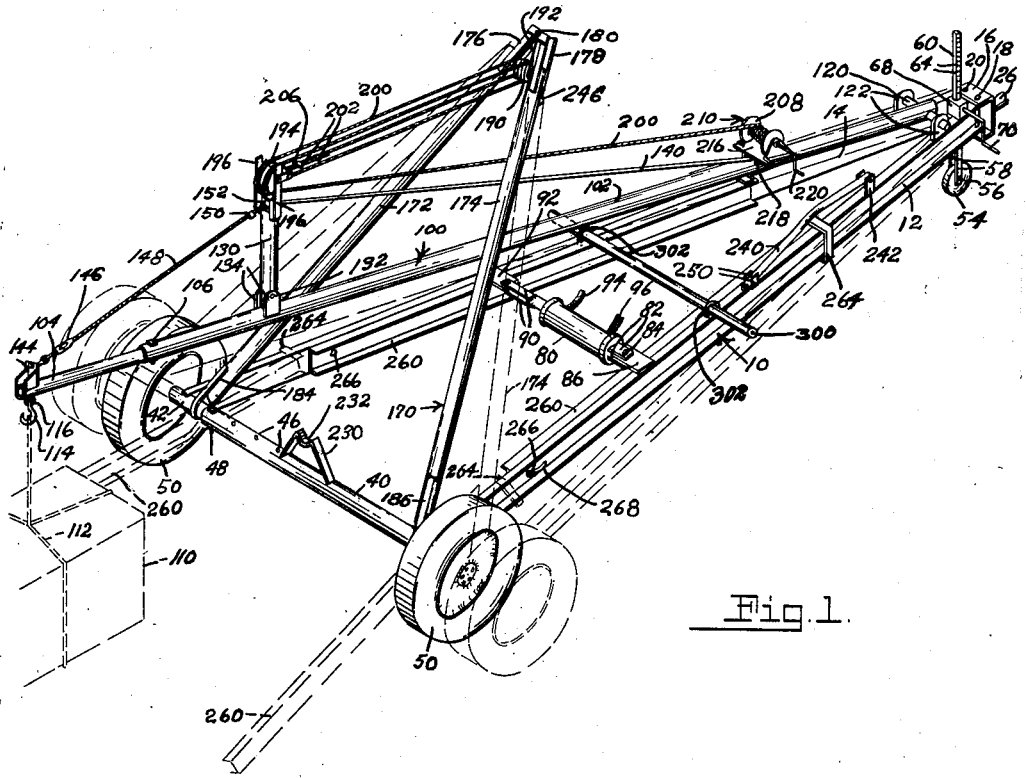

Figure 1 is a perspective view of the trailer hoist of this invention shown in a partially upraised position assumed when the load is still on the ground, certain more outwardly spread positions of the wheels and frame members being shown in dotted lines. Legs used for increased stability are shown in full lines in storage positions and in dotted lines in used positions. A broken away dotted line section of a box about to be lifted is shown attached to the end of the boom.

Figure 2:
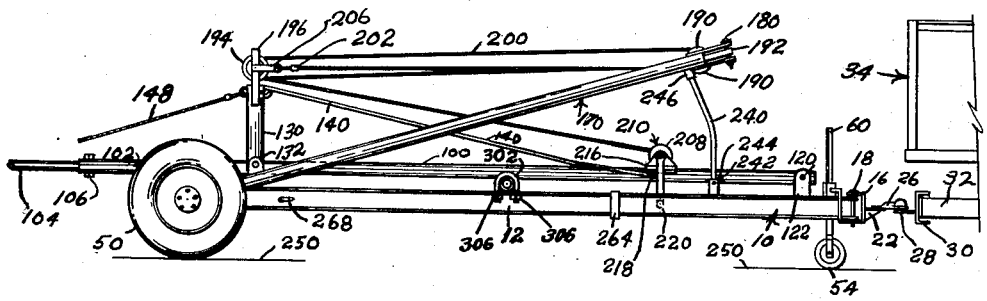

Figure 2 is a side-elevation of the trailer in a trailing position, a rear end portion of the trailer and a forward portion of a towing truck being shown broken away.

The trailer hoist of this invention is provided with a frame generally indicated at 10. The frame 10 comprises two straight elongated inclined disposed frame members 12 and 14.

The frame members 12 and 14 converge at their forward ends to an apex and are coupled together by means of a C-shaped cap member 16 which latter has two bolts 18 and 20 disposed vertically through its upper and lower end portions. The bolts 18 and 20 extend through the side frame members 12 and 14 for pivotally securing them together.

The cap 16 has a bracket 22 secured thereto for mounting the socket portion 26 of a trailer hitch.

The socket portion 26 is adapted to fit about the ball portion 28 which latter is secured by means of a bracket 30 to a rearward end portion 32 of a truck or other towing vehicle generally indicated at 34 in Figure 2.

The frame members 10 and 12 diverge rearwardly and are connected together by means of telescoping frame or axle members 40 and 42. The member 40 is a hollow pipe slidably disposed about the outside of the member 42. The member 40 is provided with a plurality of apertures 46 for receiving a bolt 48. The member 42 is similarly provided with one or more apertures whereby the bolt 48 can be disposed through selected ones of the apertures for selectively spacing apart outer ends of the members 40 and 42. The said outer ends are rotatably secured to rear wheels 50 and are further secured to the rearward ends of the side frame members 12 and 14.

The forward end of the frame is preferably supported on a wheel 54 which latter is rotatably mounted on an axle 56 between two supporting members 58.

The members 58 are secured to a jack bar 60, which latter is provided with a plurality of teeth 64 on a side thereof for engaging a pinion, not shown. The pinion is disposed in a box 68 and can be caused to rotate by turning a crank handle 70. Turning the handle 70 in different directions will raise and lower the wheel 54.

A hydraulic ram 80 is provided for facilitating the spacing apart of the wheels 50 to provide stability during hoisting. The ram 80 is attached by ears 82, a pivot pin 84 and bracket 86 to the inner side of the frame member 12. The other end of the ram is attached by means of ears 90 and a bracket 92 to the inner side of the side frame member 14.

The ram is provided with two hose lines 94 and

96. The same can be connected to a source of hydraulic power in the towing vehicle 34 and controlled at the source in such a manner that the ram is caused either to expand or contract, each hose 94 and 96 entering the cylinder on a different side of the ram.

The brackets 86 and 92 extend across the top of the side frame members 12 and 14 so as not to interfere with later described leg members.

The extensible wheel base frame is provided with hoisting means now to be described.

The hoisting mechanism includes a longitudinally extending boom 100. The boom is provided with a main portion 102 preferably formed of a hollow piece of pipe. Telescopically disposed in the rearward end of the pipe 102 is a second boom section 104 secured in place by a bolt 106.

The second section 104 can be attached to a load 110 to be lifted in any suitable manner such as by means of a rope 112 and a hook 114 secured to the outer end of the boom by means of an eyelet 116.

The forward end of the boom 100 is pivotally secured to the frame in any suitable manner. Preferably, a pivot shaft 120 is disposed through the forward end of the boom in horizontal position and extends through ears 122. The ears 122 extend upwardly from the frame members 12 and 14.

The boom 100 is strengthened by a cable supporting arm 130 which extends upwardly therefrom at a right angle. The arm 130 is pivotally secured at 132 to a pair of ears 134 which latter are welded one on each side of the boom 100. A rod 140 is hooked through an aperture, not shown, in the upper end of the arm 130, although any other means of securing the rod 140 to the arm 130 could also be used. The forward end of the rod 140 is secured to the boom 100 in any suitable manner adjacent the forward end thereof. The rearward end of the boom 100 is secured to the rearward side of the arm 130 by means of a bracket 144 on the boom portion 104, a turn buckle 146, a cable 148, a cable clamp 150 and an eyelet 152 which latter secures the upper end of the cable 148 to the arm 130.

The boom is raised and lowered by means including a mast generally indicated at 170. The mast 170 is preferably of an inverted V-shape having two inclinedly disposed side portions 172 and 174. The latter are connected at their upper ends by extensions 176 and 178 which are attached one each to the sides 172 and 174. The upper ends of the sections 176 and 178 are pivotally secured at 180.

The lower ends of the mast are secured by means of straps 184 and 186 to the frame sections 40 and 42. The lower ends of the mast are connected adjacent the frame members 12 and 14 and can be spread apart simultaneously with the spreading of the wheels 50.

It will be seen that the straps 184 and 186 form means for indirectly pivotally attaching the respective mast portions 172 and 174 to the respective frame sections 42 and 40 for the pivoting of the upper end of each mast portion forwardly and rearwardly for raising and lowering. The straps 184 and 186 also freely permit the pivoting of the upper end of each mast portion from side to side to a limited extent whereby the mast does not bind against the frame portions 42 and 40 during movement of the wheels 50 into outer positions.

A multiple pulley 190 is disposed in the apex of the mast 170. The pulley 190 is pivotally secured to the pivot pin 180 by means of a strap 192 or other suitable means. A second multiple pulley 194 is pivotally mounted on a pair of extension arms 196 which latter extend upwardly from the arm 130. A cable or its equivalent 200 is disposed around the pulleys 190 and 194 and is secured by means of cable clamps 202 to an anchor bracket 206. The bracket 206 is pivotally secured to the upright arms 196.

The other end of the cable 200 is wound about and anchored to the drum 208 of a winch 210. The winch 210 is disposed above the boom 100 adjacent its forward end, being mounted on a platform 216 which latter is held in place by a piece 218 C-shaped in cross section and extending across the top of the boom 100, open side downward. The winch 210 has a handle 220 by which it can be cranked, although it will be seen that power driven means could also be employed if desired.

A bracket 230 is secured to the upper side of the frame member 40 at approximately midway through the road-traveling positions of the wheels 50. The bracket 230 is provided with a notch 232 in its upper side for receiving the boom 100.

An elongated mast support 240 is pivotally secured by means of ears 242 and a pin 244 to the frame member 12 adjacent the forward end thereof. The mast support 240 is adapted to swing upwardly and to be received in a receiving cup 246, which latter is rigidly secured to the under and forward side of the mast 170 adjacent its upper end.

The mast support 240 is adapted to hold the mast in the position shown in Figure 2 during road traveling movement, while the support 240 is folded backwardly along the upper side of the frame member 12 and held in place by means of resilient ears 250.

During road traveling it will be seen that the wheel base of the trailer can be made more narrow by use of the hydraulic cylinder 80 or by manually pushing the wheels together. They are held securely in place by the bolt 48, the boom resting in the bracket 230 and the mast upheld by the support 240 in the position shown in Figure 2.

During trailing the front wheel 54 can be on the surface of the ground or highway 250 or raised upwardly therefrom in accordance with the amount of weight the towing vehicle can carry. It will be seen that when the trailer is loaded, the load 110 is disposed rearwardly of the wheels 50 whereby the weight of the trailer hoist itself is not carried by the towing vehicle to any great extent.

When it is desired to use the hoist for lifting, the load 110 is secured to the end of the boom 100 following the extension of the boom portion 104 and the attachment of the cable 148. It will be seen that the rearward end 104 of the boom 100 can be slid inwardly of the boom portion 102 in order to lessen the length of the trailer for road traveling.

As the crank handle 220 is turned the mast 170 and boom 100 will both gradually raise into the position shown in Figure 1 and will continue to raise until the mast is disposed substantially upright and above the boom pulley 194. Hoisting then continues until the load 110 is raised sufficiently for road traveling.

During hoisting when the boom is loaded the mast pulley 190 and the boom pulley 194 are disposed one above the other in substantial alignment with the mast which is then in its most upright position. In this way the direction of pull is proper and direct for maximum hoisting pull and minimum frictional loss.

When the load 110 is unusually large, greater stability is provided by the use of a pair of stabilizing legs 260. The legs 260 are normally disposed alongside the frame members 12 and 14, being secured to the inner sides thereof by means of slidable straps 264 and bolts 266 having a leverage nut 268 holding the same in place.

When greater stability is desired the bolts 266 are removed and the legs 260 are slid rearwardly along the respective frame members 12 and 14 until the legs 260 extend beneath the frame members 42 and 40 between the wheels rearwardly into the position shown in dotted lines in Figure 1.

This invention has provided a hoisting mechanism which can be attached to a vehicle and pulled like a trailer, which has an extensible wheel base and extensible length, which is of collapsible height and which can be very economically produced in proportion to its capacity and utility.

From the foregoing description, it is thought to be obvious that a trailer hoist constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

A particular use of the trailer hoist of this invention is in the carrying and setting up of telephone poles. For carrying the poles their rearward ends are rested upon and carried by the outer transverse frame member 40 between the rear wheel 50.

The forward ends of the telephone pole are supported and carried on a second transverse member 300 which latter can be in the form of a pipe, as shown, or in other shapes as desired. The transverse member 300 is placed well forward of the frame member 40 and the telephone poles can be lashed to the members 40 and 300 in any desired manner.

The member 300 is held in place by two U-bolts 302. One of the U-bolts 302 is disposed through apertures in the upper side of the corresponding frame member 12. This U-bolt is held rigidly in place by two nuts 306 disposed on the under side of the upper flange of the channel iron frame member 12.

The opposite U-bolt 302 is similarly disposed through apertures in the upper flange of the other channel iron frame member 14. The U-bolt on the channel iron 14, however, is either without nuts or its nuts or other securing means permit it to be loosely disposed in its apertures. This is for the reason that it is desirable that the transverse frame member 300 be permitted to slide transversely of the frame so as to not interfere with the adjustable wheel base feature thereof.

I claim:

1. A trailer hoist comprising: a frame; wheels supporting the rearward end of said frame; a boom longitudinally disposed with respect to said frame; means pivotally securing the forward end of said boom to the forward end of said frame; a mast having side portions disposed respectively on each side of said boom and said portions being connected at their upper ends above said boom, the lower ends of said mast portions being connected to said frame, the boom projecting rearwardly a substantial distance from the lower ends of said mast portions in all positions of said boom relative to said frame for making possible the lifting of large objects on the rearward end of said boom without interference with said mast; a first pulley means suspended from the top of said mast between said mast portions; a second pulley means; means securing said second pulley means to said boom; and an elongated flexible means cooperative with said first and second pulley means for first simultaneously raising said mast and boom and later raising said boom alone still further, said second pulley means being disposed at a point with respect to said boom and mast such that when said boom is loaded, said mast assumes a substantially upright position and said first and second pulley means are disposed respectively one above the other in substantial alignment with said mast.

2. A trailer hoist comprising: a frame having two longitudinal sections alongside each other, said sections being pivotally secured together at their forward ends; two wheels attached one each to and supporting said frame sections at the rearward ends of said frame sections; adjustable means for securing the rearward ends of said frame sections together for the selective spacing of the rearward ends of said frame sections to provide adjustable wheel base; a boom longitudinally disposed above said frame and having its forward end pivotally secured to the forward end of said frame; a mast having two portions disposed on opposite sides of said boom, said mast portions being pivotally connected together at their upper ends; means pivotally attaching the lowermost ends of said mast portions each to the respective one of said frame sections for the pivoting of the upper end of said mast forwardly and rearwardly and in a manner permitting a freedom of selective spacing of the rearward ends of the said frame sections; and hoisting means interconnecting said mast and said boom for first simultaneously raising said mast and boom and later raising said boom still further.

3. The combination described in claim 2 in which two stabilizing leg members are disposed respectively adjacent the inner side of each of said frame members; means slidably securing the forward ends of said legs to said frame members and permitting the rearward ends of said legs to be disposed beneath said rearward frame member securing means when the device is in use.

CARL STRAUB.

References Cited in the file of this patent

UNITED STATES PATENTS

| Number | Name | Date |
| --- | --- | --- |
| 272,987 | Thompson | Feb. 27, 1883 |
| 350,213 | Rounds | Oct. 5, 1886 |
| 538,186 | Widdows | Apr. 23, 1895 |
| 886,221 | Klewitter | Apr. 28, 1908 |
| 901,252 | McLeran | Oct. 13, 1908 |
| 1,210,056 | Fairman | Dec. 26, 1916 |
| 1,391,109 | Haubert | Sept. 20, 1921 |
| 1,840,666 | Grundon | Jan. 12, 1932 |
| 2,413,302 | Farrell | Dec. 31, 1946 |
| 2,461,433 | Moulton et al. | Feb. 8, 1949 |
| 2,479,099 | Cerny | Aug. 16, 1949 |